May 13, 1930.                B. FORD                1,758,506
STORAGE BATTERY
Filed Sept. 8, 1925        3 Sheets-Sheet 1

WITNESS:

INVENTOR
Bruce Ford
BY
Augustus B. Stoughton
ATTORNEY.

May 13, 1930.  B. FORD  1,758,506
STORAGE BATTERY
Filed Sept. 8, 1925  3 Sheets-Sheet 2

WITNESS:

INVENTOR
Bruce Ford
BY
Augustus B. Stoughton
ATTORNEY.

Patented May 13, 1930

1,758,506

UNITED STATES PATENT OFFICE

BRUCE FORD, OF PHILADELPHIA, PENNSYLVANIA

STORAGE BATTERY

Application filed September 8, 1925. Serial No. 54,866.

Objects of the present invention are, first, to effect an economy in the construction and assembly more especially in respect to the intercell connections; second, to improve the external construction and appearance of a storage battery; and third, to effect an economy in both labor and material.

Other objects of the invention will appear from the following description and, stated broadly, the invention may be said to comprise a storage battery having its intercell connections housed inside its cover or covers.

The invention also comprises the improvements to be presently described and finally claimed.

In the following description reference will be made to the accompanying drawings forming part hereof and in which Figure 1 is a sectional elevational view of so much and of such parts of a storage battery as is necessary for illustrating features of the invention in application thereto.

Figure 1:
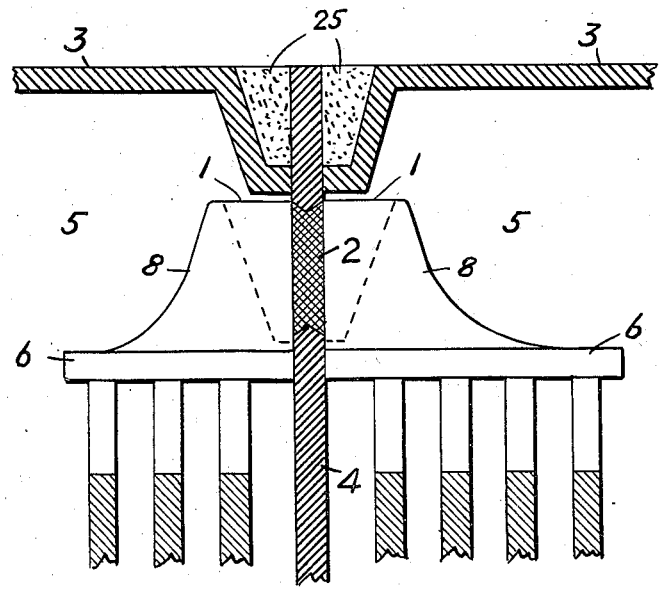
Figure 2:
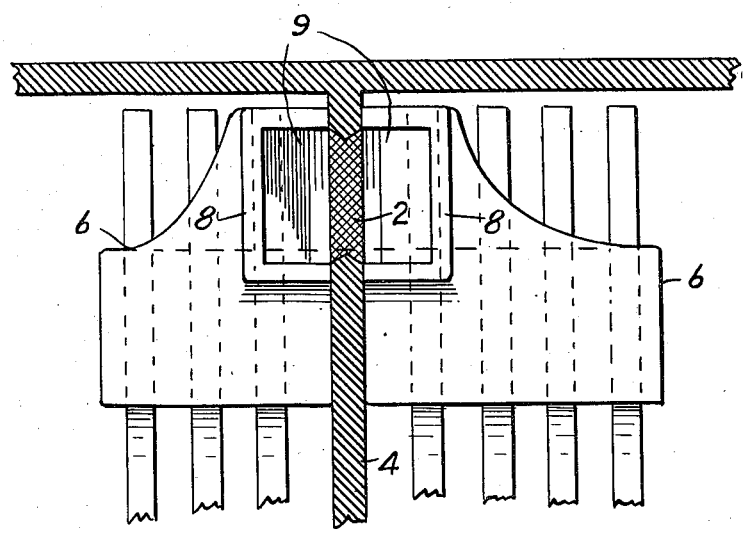
Fig. 2 is a top or plan view of Fig. 1 showing the same with the cover or covers removed and with the cell walls in section.
Figure 3:
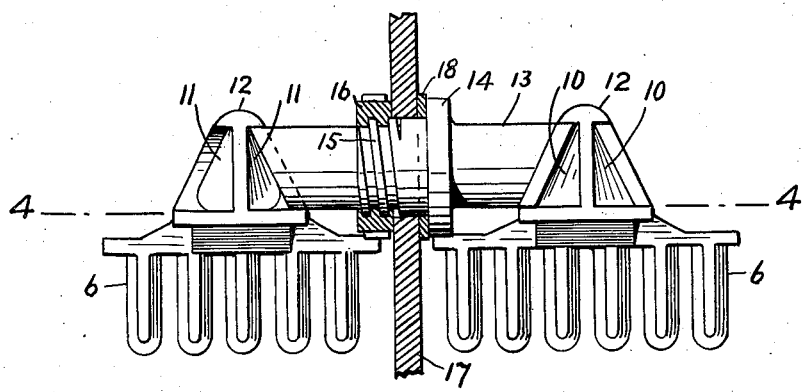
Fig. 3 is a top or plan view illustrating a modification.

Referring more particularly to Figs. 1 and 2, the intercell connection indicated at 1 and 2 is housed inside of the cell cover or covers 3 and extends through an opening provided in a cell wall 4. It will of course be understood that the cell wall 4 is a part of a battery container of which the space, generally indicated at 5, is a part of a covered cell. 6 is a plate structure housed within the interior of a covered cell and above which there is a gas space. As shown the part 2 of the intercell connector is a conducting button mounted in the cell wall 4, and the part 1 of the intercell connector consists of conducting metal such as lead alloy. The terminals 8 of the plate structures and the part 2 of the connector are equipped with spaced confronting walls providing between them chambers 9, Fig. 2, of which the walls provide dams useful in installing the parts 1 of the connector by the use of fluid metal or lead alloy. It may be stated that the parts 1 and 2 and the terminals 8 are in effect continuous and the demarcation shown and above referred to is set forth for the sake of explanation.

Figure 4:
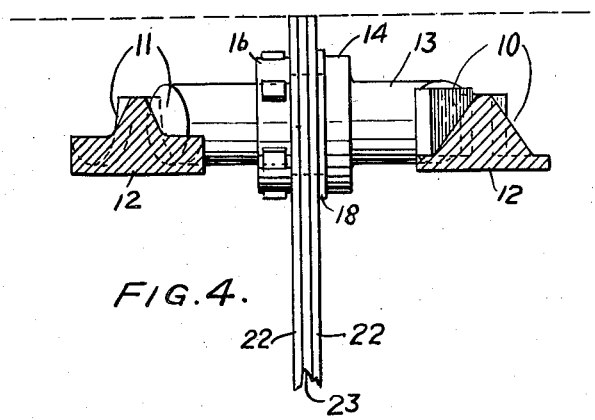
Fig. 4 is a sectional view taken on the line 4—4 of Fig. 3.
Figure 5:
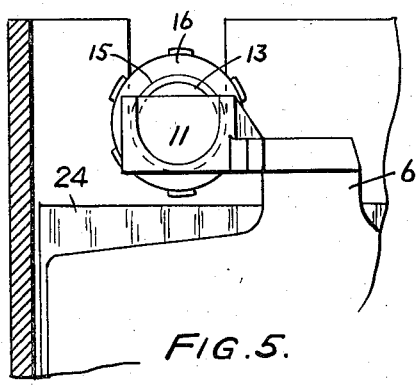
Fig. 5 is an end view looking from left to right in Fig. 4 also showing a slight modification.
Figure 6:
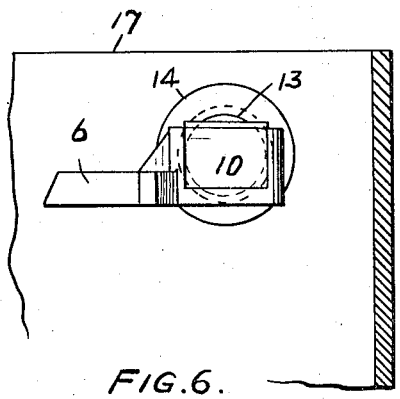
Fig. 6 is an end view looking from right to left in Fig. 4.

The construction and mode of operation of the modification shown in Figs. 3-6, is substantially as has been described in connection with Figs. 1 and 2, except that the chambers 10 and 11 are duplicated upon opposite side faces of each terminal 12, and these chambers 10 and 11 are of different configuration, one, 11, being generally curved, and the other, 10, being generally rectangular to accommodate correspondingly shaped ends of a connector 13, thus insuring proper assembly in respect to the sign of the pole plate structures. These chambers are filled with conducting metal which may be introduced in a molten condition, as by puddling or pouring. The connectors 13 are provided in spaced relation with a collar 14 and with an external thread 15, cut into the portion 15' thereof. 16 is a nut engaging the thread 15 and serving with the collar 14 to clamp a cell wall 17. 18 is a soft lead washer adapted to be slipped over the thread 15 and over the portion 15' and it is interposed between the cell wall and collar 14, and serves to provide a tight joint. The opening provided in the cell wall for the passage of the connector may be bounded by a continuous wall, as shown for example in Fig. 3, or it may be in the form of a notch as shown in Fig. 5, in which case the notch is filled with appropriate material, not shown in Fig. 5 for the sake of clearness, and adapted to provide substantial continuity of the cell wall. The cell wall may be a partition across a single container or it may be the end walls 21 and 22 of two containers having interposed between them a soft gasket 23 as of rubber. This is shown in Fig. 4, and in Fig. 5 there is shown a separator 24. In Fig. 1, 25 is a sealing compound.

Figure 7:
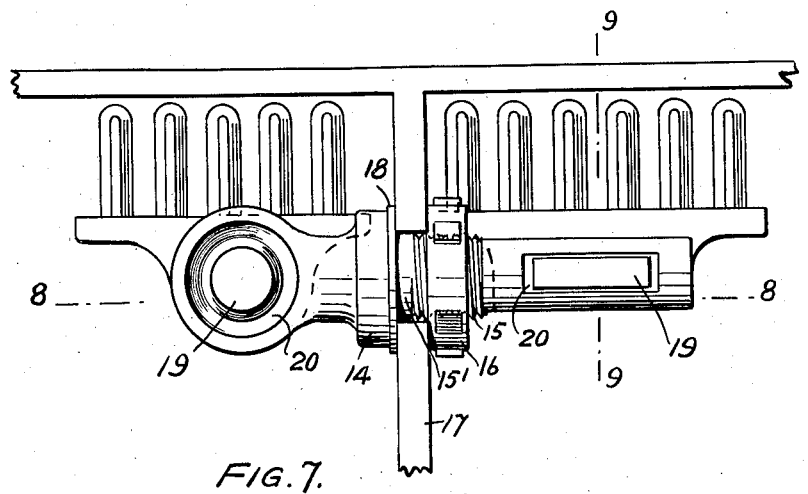
Fig. 7 is a top or plan view illustrating another modification.
Figure 8:
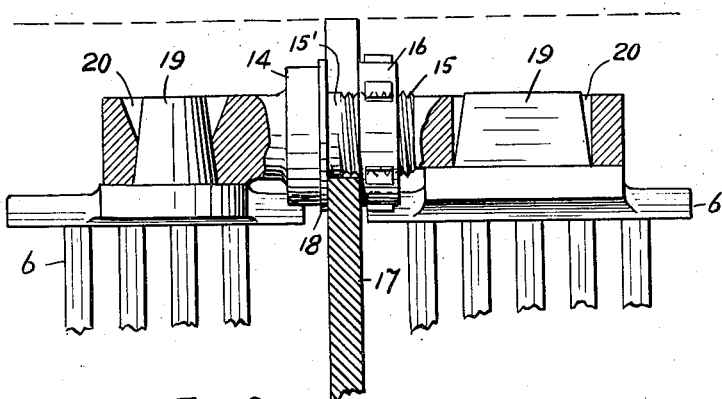
Fig. 8 is a sectional elevation taken on the line 8—8 of Fig. 7.
Figure 9:
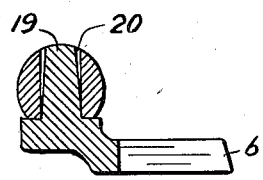
Fig. 9 is a sectional view taken on the line 9—9 of Fig. 7.

The construction and mode of operation of the modification shown in Figs. 7–9 are as above described except that the terminals 19 of the plate structure assume the form of posts of which one is rectangular and the other curved and in these figures 20 are the chambers above referred to in connection with Figs. 1 and 2, it being understood that these chambers are filled with metal that can be introduced in the molten state although it is not shown in the drawings for the sake of clearness. In this connection it may be said that the button 2 of Fig. 1 may not be primarily inserted in the manufacture of the container and that the opening provided in a vertical cell wall for its reception can be filled with conducting metal by pouring.

Of course the cover may be omitted in some cases.

It will be obvious to those skilled in the art that modifications may be made in details of construction, arrangement and matters of mere form without departing from the spirit of the invention which is not limited in respect to such matters or otherwise than as the prior art and the appended claims may require.

I claim:

1. An inside intercell connection for storage batteries including in combination a container having covered cells, plate structures housed within the covered cells and provided with terminals, an intercell connection extending through an opening provided in a cell wall and also housed within covered cells, said connector having in spaced relation a collar and an external thread, and a nut engaging the thread and serving with the collar to clamp a cell wall.

2. An inside intercell connection for storage batteries including in combination a container having covered cells, plate structures housed within the covered cells and provided with terminals, an intercell connection extending through an opening provided in a cell wall and also housed within covered cells, said connector having in spaced relation a collar and an external thread, a nut engaging the thread and serving with the collar to clamp a cell wall, and a soft metal washer adapted to be slipped over the thread into contact with the collar.

3. A storage battery having its intercell connections confined within its interior and arranged through its vertical wall and provided with means disposed on opposite sides of said wall and constructed and arranged to clamp the cell wall between them and to seal the opening between the connection and wall.

BRUCE FORD.